United States Patent [19]

Lane

[11] Patent Number: 4,846,770

[45] Date of Patent: Jul. 11, 1989

[54] EMERGENCY INTERLOCKING BELT

[76] Inventor: Ben J. Lane, 22641 DelValle St. #7, Woodland Hills, Calif. 91364

[21] Appl. No.: 115,200

[22] Filed: Nov. 2, 1987

[51] Int. Cl.⁴ .............................................. F16G 3/10
[52] U.S. Cl. .................................... 474/253; 24/31 C
[58] Field of Search ............................... 474/253–258; 24/31 B, 31 C, 37; 156/304.5, 304.1

[56] References Cited

U.S. PATENT DOCUMENTS 4,254,666  3/1981  Seredick ............................. 474/253
4,596,540  6/1986  geppert ............................. 474/253
4,642,081  2/1987  Balomenos ......................... 474/253

FOREIGN PATENT DOCUMENTS 0086431  10/1920  Fed. Rep. of Germany ...... 474/253

Primary Examiner—Thuy M. Bui
Attorney, Agent, or Firm—Leon Gilden

[57] ABSTRACT

An emergency belt construction is set forth wherein a discontinuous belt construction is configured of inter-engaging recesses and projections. The projections and recesses are configured to maximize surface contact between the associated ends of the discontinuous belt for securement thereof. The complementary surfaces are lined with velcro-like material to insure a secure inter-engagement therebetween complementary surfaces to secure the ends of the belt together. Additionally, loop connectors are exteriorly securable about the so secured belt ends to ensure securement.

1 Claim, 1 Drawing Sheet

U.S. Patent     Jul. 11, 1989     4,846,770
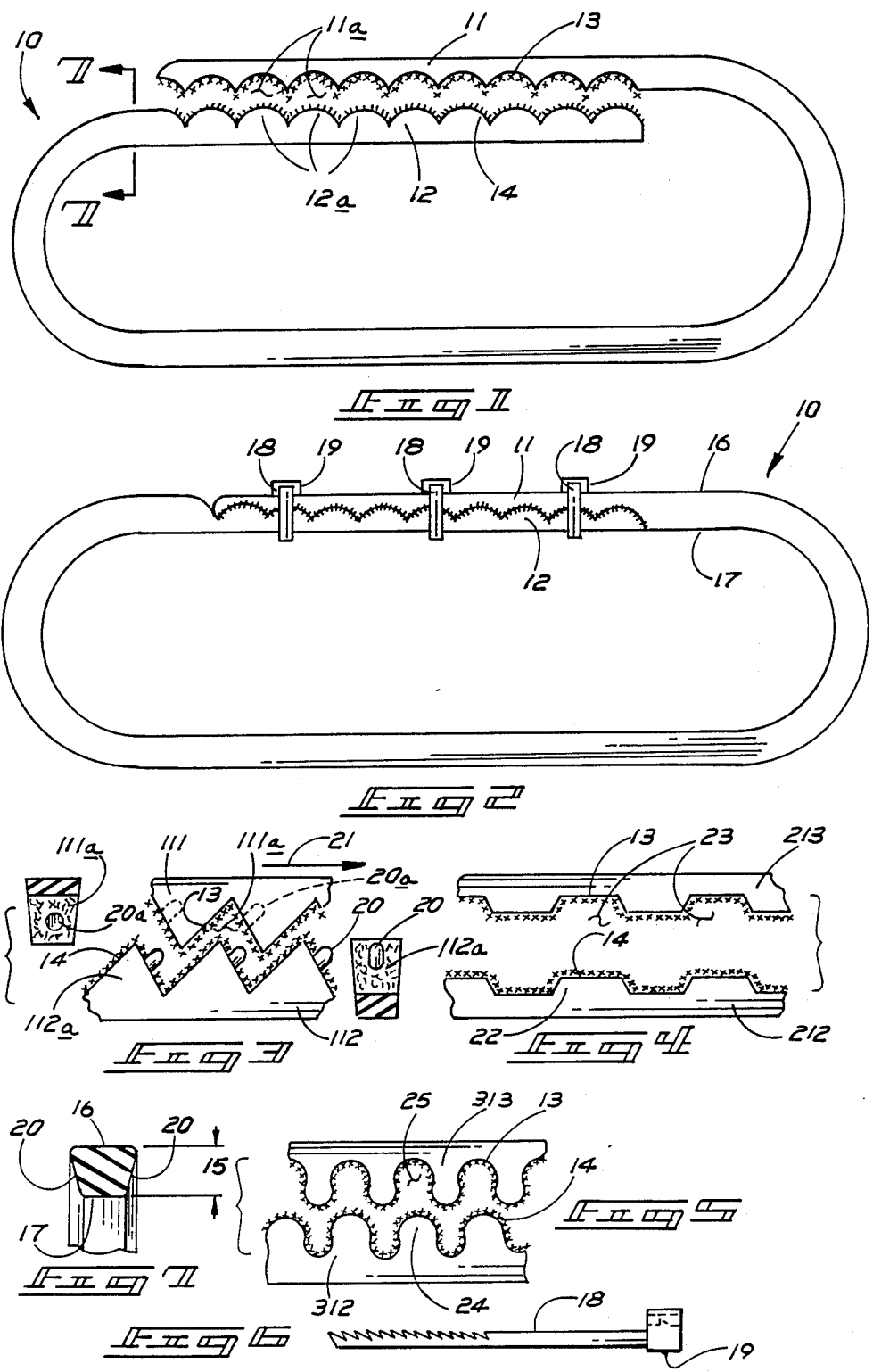

EMERGENCY INTERLOCKING BELT

BACKGROUND OF THE INVENTION

1. Field of the Invention

The present invention relates to emergency belt construction and more particularly pertains to a new and improved emergency belt which provides for complementary projections and recesses maximizing surface inter-engagement for a secure interfitting of the discontinuous ends of the emergency belt when use thereof is contemplated.

2. Description of the Prior Art

The use of emergency belt construction is well known in the prior art. As may be appreciated, these belts have normally been of limited effectiveness in actual field use. Typically in belt construction particularly utilized with motor vehicles, a fan-type belt due to its high tension working environment and associated heat, deteriorates and resists utilization of discontinuous type belt constructions. In this connection, there have been several attempts to develop emergency belts which may be easily and efficiently utilized when needed. For example, U.S. Pat. No. 4,254,666 to Seredick sets forth an interconnectable discontinuous belt wherein a tapered projecting end portion interfits within a receiving and complementary shaped female portion to effect an interlocking one-way engagement by means of complementary shaped teeth secured together by means of an external tool utilized in conjunction with a belt. Openings proximate the terminal end of the receiving portion of the belt enable extra lengths of said belt to be passed therethrough and thereafter removed in use.

U.S. Pat. No. 4,596,540 to Geppert sets forth another discontinuous belt formed with mating loop structure to accommodate a single overlapped end segment to form a continuous belt thereby. The Geppert patent is limited to a single interfacing relationship and accordingly to a single working diameter, and is furthermore of limited inter-engaging surface structure to insure securement of the two ends.

U.S. Pat. No. 1,266,275 to Kelley utilizes an interlaced structure to secure two ends of a discontinuous belt together to form a continuous drive belt. The interlaced organization is somewhat inconsistent with contemporary "V" construction and further requires securement of the two ends of the belt together prior to attachment about a pulley system thereby requiring the additional use of tools and the like for adjustment of the pulleys to enable securement of the Kelley belt for use about pulleys in an automotive environment.

U.S. Pat. No. 1,452,704 to Poulin, et al., sets forth a belt construction utilizing discontinuous inner and outer loops sandwiching a central belt wherein punches piercing the inner and outer loops secure fabric through the central belt portion and thereby forms a continuous belt. The Poulin patent is of limited application as an emergency belt and is essentially a further means of manufacturing an endless belt on an assembly line basis.

U.S. Pat. No. 4,315,349 to Stolz sets forth a connector strip for conveyor belts including a plurality of pre-shaped connector elements for securement of the two ends of the conveyor belt. The connectors are a rather complex organization and are of limited applicability in associating an emergency belt organization, as set forth by the instant invention.

As such it may be appreciated that there is a continuing need for a new and improved emergency interlocking belt organization which addresses both the problem of strength and adaptability and in this respect, the present invention substantially fulfills this need.

SUMMARY OF THE INVENTION

In view of the foregoing disadvantages inherent in the known types of interlocking belt structures now present in the prior art, the present invention provides an emergency interlocking belt formed of cooperating protuberances and recesses to securely fasten two ends of this continuous belt together for providing immediate and effective fan belt replacement during emergency situations. As such, the general purpose of the present invention, which will be described subsequently in greater detail, is to provide a new and improved emergency interlocking belt which has all the advantages of the prior art interlocking belt structures and none of the disadvantages.

To attain this, the present invention comprises a discontinuous emergency belt structure wherein an overlying first terminal end complementarily interfits with a second underlying second terminal end to form a continuous belt organization. The underlying and overlying portions are formed of interfitting recesses and projections of the two respective terminal end portions. The recesses and projections are configured as semi-circular surfaces, triangulated surfaces utilizing an additional projecting buttons thereon to interfit with companion recesses, trapezoidal recesses and projections, or interfitting "U" shaped surfaces. Velcro-type engagement structure is formed on said interfitting surfaces to enable secure mating connection between said two respective portions wherein securement bands may be optionally utilized to insure continuous connection of said two respective end portions once associated together.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved emergency interlocking belt which has all the advantages of the prior art emergency interlocking belts and none of the disadvantages.

It is another object of the present invention to provide a new and improved emergency interlocking belt which may be easily and efficiently manufactured and marketed.

It is a further object of the present invention to provide a new and improved emergency interlocking belt which is of a durable and reliable construction.

An even further object of the present invention is to provide a new and improved emergency interlocking belt which is susceptible of a low cost of manufacture with regard to both materials and labor, and which accordingly is then susceptible of low prices of sale to the consuming public, thereby making such emergency interlocking belts economically available to the buying public.

Still yet another object of the present invention is to provide a new and improved emergency interlocking belt which provides in the apparatuses and methods of the prior art some of the advantages thereof, while simultaneously overcoming some of the disadvantages normally associated therewith.

Still another object of the present invention is to provide a new and improved emergency interlocking belt formed of a discontinuous belt organization wherein said belt organization includes two interfitting terminal end portions.

Yet another object of the present invention is to provides a new and improved emergency interlocking belt wherein an underlying and overlying terminal end portion of a discontinuous belt interfit to form a continuous belt of a common cross-sectional dimension.

Even still another object of the present invention is to provide a new and improved emergency interlocking belt wherein mating terminal end portions of a discontinuous belt are formed as semi-circular surfaces, triangulated surfaces including interfitting nipple structure, interfitting trapezoidal configuration and interfitting "U" shaped configurations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side orthographic view of the present invention illustrating a first embodiment.

FIG. 2 is an orthographic side view of the present invention of FIG. 1 illustrating the terminal end portions of the invention secured together and the additional use of flexible ties.

FIG. 3 is an orthographic side view of the present invention illustrating a further embodiment of the mating surfaces.

FIG. 4 is a side orthographic view of the present invention illustrating a further configuration of the mating portion of the respective ends.

FIG. 5 is a side orthographic view of the present invention illustrating a further embodiment of the mating surfaces of the respective ends.

FIG. 6 is an orthographic side view of the securement ties utilized in conjunction with the instant invention.

FIG. 7 is a cross-sectional view taken along the lines 7—7 in the direction indicated by the arrows of FIG. 1.

DESCRIPTION OF THE PREFERRED EMBODIMENT

With reference now to the drawings, and in particular to FIG. 1 thereof, a new and improved emergency interlocking belt embodying the principles and concepts of the present invention and generally designated by the reference numeral 10 will be described.

To attain this, the present invention comprises a fan belt formed as a finite length of belt with a first terminal end section 11 and a second terminal end section 12. First terminal end section 12 is formed of a plurality of semi-circular protuberances 12a formed along said end section 12 a distance of approximately 6 to 12 inches. Accordingly, complementary recesses 11a are formed along a comparable length defining said second terminal end section 11 to interfit with said protuberances 12a, essentially as illustrated in FIG. 2. The protuberances and cooperating recesses 12a and 11a define an arc equal to somewhat less than 180 degrees. Adhering the first and second terminal end sections together in a secure and united fashion are mating velcro-type hooks 13 to associate with velcro-type loops 14. The semi-circular recesses and protuberances, as noted, maximize the surface area of the mating velcro-type attachment means enabling a more secure interfitting and an operative relationship between the two end sections. As illustrated in FIG. 2, upon the mating of first and second terminal sections 11 and 12 respectively, the height 15 between outer surface 16 and inner surface 17 of the interlocking belt 10 is substantially uniform throughout the thusly secured interlocking belt arrangement.

To insure an interfacing and continuous relationship in use, plastic-like ties 18, as conventionally utilized in binding operations, are looped and secured about emergency interlocking belt 10 to encompass the belt, essentially as illustrated in FIG. 2. The projection of locking heads 19 of the plastic-like ties 18 above outer surface 16 will not affect the operation and effectiveness of the interlocking belt structure in that this belt is intended for utilization between conventional "V" groove pulleys whereupon only the inner surface 17 and defined sides 20 will bear against the pulley surfaces thereby creating no interference of the projection of heads 19, as illustrated. The thickness of the loop of the ties 18 are of minimal dimension and have been found to be completely adequate in the emergency usage of the interlocking belt organization 10.

FIG. 3 illustrates a further embodiment of the instant invention wherein a series of interdigited and mating projections and recesses of triangular cross-sectional shape interfit in inter-engagement in essentially the same manner as the embodiment illustrated in FIG. 1. Specifically the triangular cross-sectional shape of projections 112a interfit with the complementary recesses 111a of a complementary and companion cross-sectional shape, essentially as illustrated. Further projecting buttons 20 interfit with like button shaped bores 20a and are oriented in the direction of belt rotation indicated by the directional arrow illustrated in FIG. 3. In this manner, the orientation of buttons 20 with respect to recesses 20a tend to thrust the two complementary connections together to insure engagement of the first and second end sections 111 and 112 in use. As in the first embodiment, the use of velcro engagement surfaces of velcro-type hooks 13 and velcro-type loops 14 are utilized throughout the inter-engaging surface of the end sections 111 and 112 with the exception of the button and recess surfaces 20 and 20a which serve as anchoring connections in this organization.

The modification of FIG. 4 is essentially similar to that in FIG. 1 with the exception that trapezoidal shaped protuberances 22 to inter-engage with trapezoidal recesses 23 for inter-engagement and securement of the first and second terminal end sections 212 and 213 respectively. As in the other embodiments, velcro hooks and loops 13 and 14 respectively insure the inter-engagement of the protuberance and projections, as noted. FIG. 5 is a further embodiment of the instant invention utilizing shapes of "U" configuration in cross-section set forth as 24 and 25 respectively.

In use with the various embodiments, it is noted that the plastic-like ties are utilized throughout in essentially the same manner as set forth in FIG. 2.

As to the manner of usage and operation of the present invention, the same should be apparent from the above description. However, there will be a brief discussion is illustrative in use of the instant invention and will be set forth:

Upon the breaking of a fan belt, as typically utilized in vehicle design, the emergency interlocking belt 10 may be positioned about the respective pulleys in need of a replacement belt, and if available, pliers are utilized to secure the belt and tighten same about the pulleys as much as possible. If pliers are not available, then manual pulling of the terminal end portions 11 and 12, for example, about the pulleys is adequate. Whereupon after the securement of the interfacing surfaces utilizing the velcro fastening elements 13 and 14, ties 18 are positioned about the belt, as illustrated in FIG. 2, enabling a user to continue in the use of a vehicle until a permanent replacement of a lost belt may be effected. The only deviation in the utilization of the invention resides in the embodiment of FIG. 3 wherein the buttons 13 are preferentially to be oriented in the direction of rotation of the replacement belt organization 10 in securement of terminal end sections 111 and 112 as the rotative thrust imparted to the thusly assembled belt organization tends to ensure positioning of buttons 13 in their respective recesses.

The length of terminal end sections 11 and 12 enable a user to cut off excess lengths of the sections once the belt is positioned about cooperating pulleys.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing in considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An interlocking belt for operatively associating pulleys, comprising:

a flexible body portion formed of a finite length defined by a first terminal end section and a second terminal end section to respective remote ends of said body portion, and said first terminal end section securable in an underlying orientation to said second terminal end section overlying said first terminal end section and a plurality of recesses formed on said first terminal end section of complementary shape to matingly inter-engage with protuberances formed on said second terminal end section, and securement means formed on each surface of said protuberances and recesses to interlock with one another to secure said first and second terminal end sections together, and wherein the height of said secured first and second terminal end sections is of a reduced height relative to said body portion, when secured together, equals the height of the flexible body portion, and wherein hook and loop fasteners are formed on said first and second terminal end sections to secure inter-engagement of said protuberances and recesses when said first and second terminal end sections are joined together, and wherein said protuberances are formed of triangular configuration with a projecting button extending outwardly of and beyond a surface of said triangular configuration for interfitting engagement within a complementary blind bore formed within a cooperating recess.

* * * * *